(12) United States Patent
Kim et al.

(10) Patent No.: US 10,312,957 B2
(45) Date of Patent: Jun. 4, 2019

(54) COMMUNICATION METHOD AND APPARATUS FOR WEARABLE DEVICE IN WIRELESS COMMUNICATION SYSTEM

(71) Applicant: Samsung Electronics Co., Ltd., Suwon-si, Gyeonggi-do (KR)

(72) Inventors: Sang-Bum Kim, Suwon-si (KR); Jin-Kyu Han, Yongin-si (KR); Youn-Sun Kim, Seongnam-si (KR); Sung Hwan Won, Seoul (KR); Han-Il Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/768,724

(22) PCT Filed: Oct. 14, 2016

(86) PCT No.: PCT/KR2016/011560
§ 371 (c)(1),
(2) Date: Apr. 16, 2018

(87) PCT Pub. No.: WO2017/065558
PCT Pub. Date: Apr. 20, 2017

(65) Prior Publication Data
US 2018/0316376 A1    Nov. 1, 2018

(30) Foreign Application Priority Data

Oct. 16, 2015    (KR) .................. 10-2015-0144725

(51) Int. Cl.
*H04W 88/04*    (2009.01)
*H04W 52/02*    (2009.01)
(Continued)

(52) U.S. Cl.
CPC .............. *H04B 1/385* (2013.01); *H04W 4/80* (2018.02); *H04W 28/02* (2013.01); *H04W 52/02* (2013.01);
(Continued)

(58) Field of Classification Search
CPC combination set(s) only.
See application file for complete search history.

(56) References Cited

U.S. PATENT DOCUMENTS

2009/0109907 A1*  4/2009  Tsai ..................... H04J 4/00
                                                370/329
2010/0167743 A1   7/2010  Palanki et al.
(Continued)

FOREIGN PATENT DOCUMENTS

WO    2010-047470 A2    4/2010
WO    2015-103048 A1    7/2015

*Primary Examiner* — Cindy Trandai
(74) *Attorney, Agent, or Firm* — Jefferson IP Law, LLP

(57) ABSTRACT

The present invention relates to a technology for a sensor network, machine to machine (M2M) communication, machine type communication (MTC), and the Internet of things (IoT). The present invention may be utilized for an intelligent service (smart home, smart building, smart city, smart car or connected car, health care, digital education, retail business, security and safety-related service, etc.) on the basis of the technology. The present invention relates to a communication method and apparatus for a wearable device in a wireless communication system. The communication method of the present invention comprises the steps of: linking the wearable device to a user terminal located in a short range within which communication with the wearable device is possible, in order to communicate with the user terminal; and when the wearable device is operating in a power-saving mode, receiving, through the user terminal, data of the wearable device, which is transmitted on the
(Continued)

basis of coupling information between the user terminal and the wearable device in a network.

13 Claims, 10 Drawing Sheets

(51) Int. Cl.
*H04B 1/3827* (2015.01)
*H04W 28/02* (2009.01)
*H04W 88/02* (2009.01)
*H04W 76/10* (2018.01)
*H04W 76/14* (2018.01)
*H04W 4/80* (2018.01)
*H04W 4/70* (2018.01)
*H04W 84/18* (2009.01)
*H04W 76/50* (2018.01)
*H04W 4/90* (2018.01)
*H04W 76/28* (2018.01)

(52) U.S. Cl.
CPC ....... *H04W 52/0229* (2013.01); *H04W 76/10* (2018.02); *H04W 76/14* (2018.02); *H04W 88/02* (2013.01); *H04W 4/70* (2018.02); *H04W 4/90* (2018.02); *H04W 28/0221* (2013.01); *H04W 76/28* (2018.02); *H04W 76/50* (2018.02); *H04W 84/18* (2013.01); *Y02D 70/24* (2018.01)

(56) References Cited

U.S. PATENT DOCUMENTS

| | | |
|---|---|---|
| 2011/0021143 A1 | 1/2011 | Kapur et al. |
| 2011/0076949 A1 | 3/2011 | Smith |
| 2011/0201310 A1 | 8/2011 | Lee et al. |
| 2012/0157129 A1* | 6/2012 | Kuwahara ............... A63F 13/12 455/457 |
| 2013/0114616 A1* | 5/2013 | Oh ...................... H04L 12/2834 370/401 |
| 2013/0336486 A1* | 12/2013 | Agiwal ................. H04W 12/04 380/270 |
| 2014/0112194 A1* | 4/2014 | Novlan ................. H04W 8/005 370/254 |
| 2014/0180488 A1* | 6/2014 | Hirayama ........... H04L 12/2816 700/295 |
| 2015/0004901 A1* | 1/2015 | Agiwal ................. H04W 76/14 455/39 |
| 2015/0092520 A1 | 4/2015 | Robison et al. |
| 2016/0044485 A1* | 2/2016 | Enomoto .............. H04W 76/14 455/41.2 |
| 2016/0080163 A1* | 3/2016 | Taylor .................. H04L 12/189 370/312 |
| 2016/0210454 A1* | 7/2016 | Chou ..................... G06F 21/32 |
| 2016/0212708 A1* | 7/2016 | Kim .................. H04W 52/0229 |
| 2017/0124853 A1* | 5/2017 | Mehta .................... H04W 4/90 |
| 2018/0077624 A1* | 3/2018 | Jung .................... H04W 36/34 |

* cited by examiner

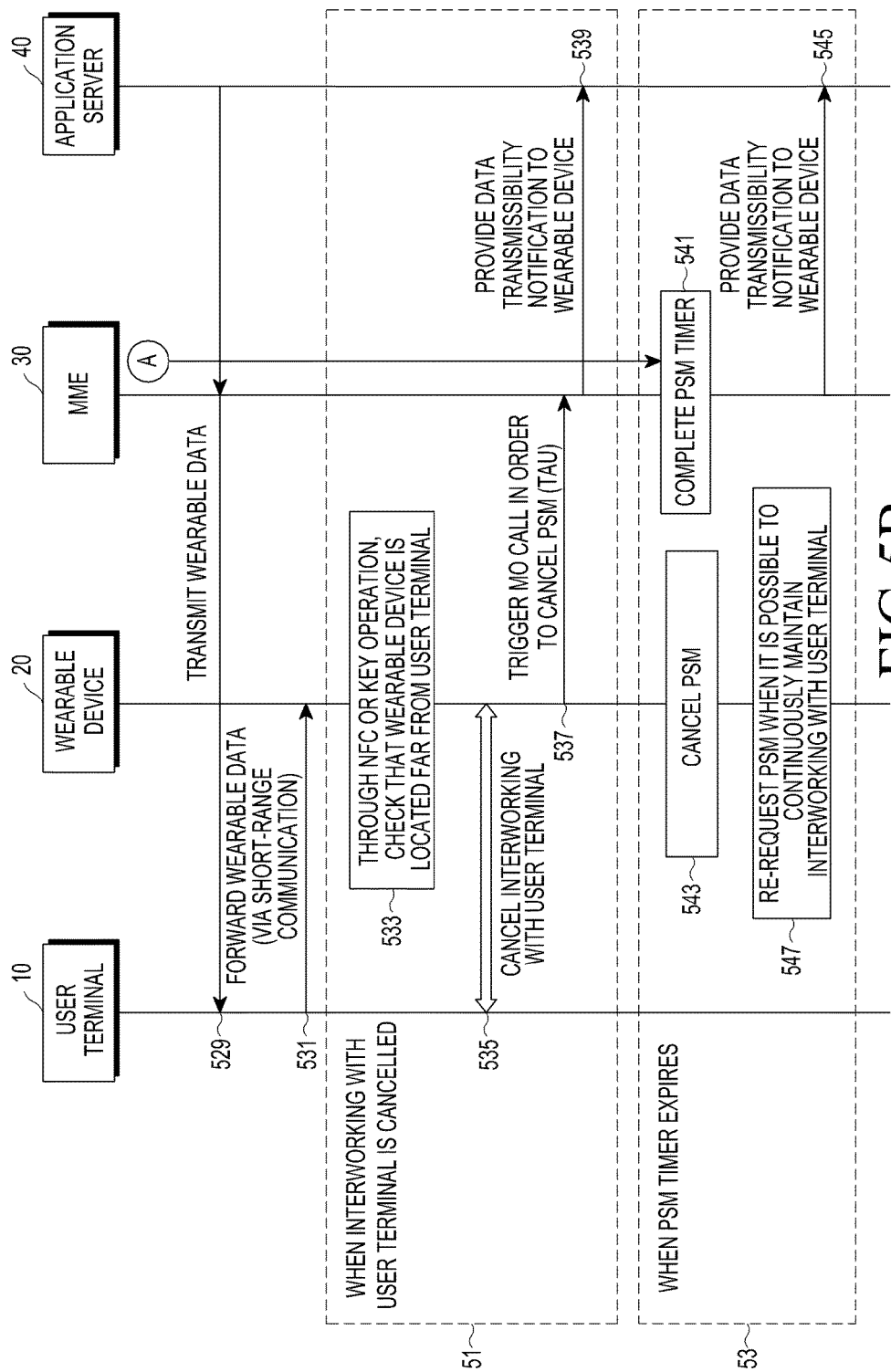

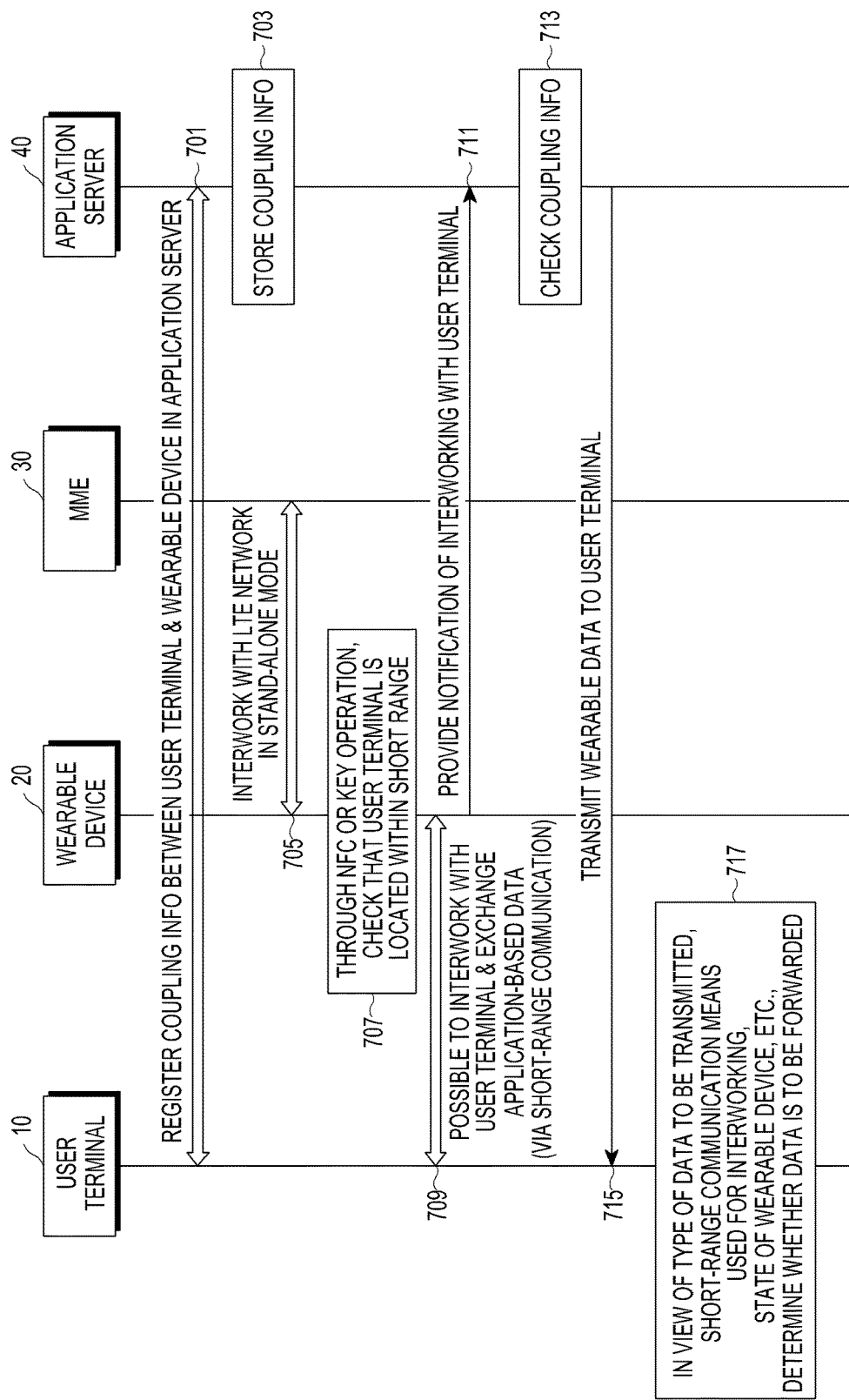

COMMUNICATION METHOD AND APPARATUS FOR WEARABLE DEVICE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2016/011560, filed on Oct. 14, 2016, which is based on and claimed priority of a Korean patent application number 10-2015-0144725, filed on Oct. 16, 2015, in the Korean Intellectual Property Office, the disclosure of which is incorporated by reference herein in its entirety.

BACKGROUND

1. Field

The present disclosure relates to a communication method and apparatus for a wearable device in a wireless communication system, and a user terminal and a network apparatus for the same.

2. Description of the Related Art

The Internet has evolved from a human-oriented connection network in which humans generate and consume information, to an Internet-of-Things (IoT) network in which distributed constituent elements, including things and the like, exchange and process information. Internet-of-Everything (IoE) technology may be one example in which technology for processing big data through a connection to a cloud server is combined with IoT technology.

In order to implement the IoT, technical elements such as a sensing technique, wired/wireless communication and network infrastructure, service interface technology, and security technology are required, and thus research has recently been conducted on a sensor network, Machine-to-Machine (M2M) communication, Machine-Type Communication (MTC), and the like for a connection between things.

In an IoT environment, it is possible to provide an intelligent Internet Technology (IT) service which creates new value in humans' lives through collection and analysis of data generated by connected things. Through the convergence and unification of the conventional Information Technology (IT) and various industries, the IoT can be applied to fields, such as smart homes, smart buildings, smart cities, smart or connected cars, smart grids, health care, smart home appliances, and high-tech medical services.

With the rapid advancement of technology, the mobile communication systems have reached a stage of provision of high-speed data communication services as well as voice communication. Recently, next-generation mobile communication systems have evolved to encompass Human to Human (H2H) communication, Human to Machine (H2M) communication, and M2M communication. In order to meet requirements therefor, in the Third-Generation Partnership Project (3GPP) communication standard, work for standardization of MTC has started. In the 3GPP SA1 Working Group (WG) standard defining services and characteristics thereof, service requirements for MTC have already been discussed.

FIG. 1 is a view for explaining a communication scenario of typical MTC.

Referring to FIG. 1, MTC devices 110 (as indicated by reference numerals 110-1, 110-2, and 110-3) are connected to a wireless operator network 111. The MTC devices 110 may be typically defined as various unmanned devices, including meters, vending machines, and the like, and have characteristics different from those of existing wireless terminals in various aspects. Also, characteristics of the MTC devices 110 may depend on the types of MTC devices. A very large number of MTC devices 110 having such various characteristics may exist within one cell. An MTC server 130, which has information on the MTC devices 110, not only serves to perform authentication, but also serves to collect pieces of information from the MTC devices 110 and deliver the collected pieces of information to a user terminal 150. The user terminal 150 is a terminal of a user who uses MTC. The MTC server 130 may exist inside or outside the wireless operator network 111. The user terminal 150 is a terminal of an end user who needs information delivered from the MTC devices 110.

MTC has characteristics different from those of existing wireless communication. Also, the characteristics of MTC are distinguished from each other according to the purpose for using MTC. For example, MTC devices, which only need to perform communication several times a day without regard to a specific time, have the characteristic of being "time-tolerant", and MTC devices, which are installed in one place and collect and transmit particular information without the need of mobility, have the characteristic of being "low mobility". A wireless operator needs to provide services in view of coexistence of the various characteristics of MTC and the existing terminals.

Meanwhile, MTC devices related to tracking of animals, freight vehicles, and the like from among the MTC devices 110 are typically supplied with power by using batteries or by independently generating power.

Accordingly, such MTC devices need to use limited power, and thus are desirably capable of efficiently using extremely low power. The 3GPP SA1 WG has defined an extra-low power consumption mode, and MTC devices may be configured to use low power in the relevant mode.

The MTC devices may be understood to be an example in which IoT technology is applied to the MTC devices, and various forms of wearable devices using the IoT technology are being developed.

SUMMARY

The present disclosure provides an efficient communication method for a wearable device in a wireless communication system and an apparatus for the same.

Also, the present disclosure provides a communication method capable of reducing power consumption of a wearable device in a wireless communication system and an apparatus for the same.

Further, the present disclosure provides a data routing/forwarding method for a wearable device in a wireless communication system and an apparatus for the same.

In accordance with an aspect of the present disclosure, a method for performing communication by a wearable device in a communication system is provided. The method includes: interworking with a user terminal in order to communicate with the user terminal located within a short range which allows communication with the wearable device; and when the wearable device is operating in a power-saving mode, receiving, through the user terminal, data of the wearable device which is transmitted based on coupling information between the user terminal and the wearable device in a network.

Also, in accordance with another aspect of the present disclosure, a wearable device of a communication system is provided. The wearable device includes: a transceiver that performs data communication; and a controller that controls interworking with a user terminal in order to perform communication with the user terminal located within a short range which allows communication with the wearable device, and receiving, through the user terminal, data of the wearable device which is transmitted based on coupling information between the user terminal and the wearable device in a network, when the wearable device is operating in a power-saving mode.

Also, in accordance with still another aspect of the present disclosure, a method for performing communication by a user terminal in a communication system is provided. The method includes: interworking with a wearable device in order to communicate with the wearable device located within a short range which allows communication; and when the wearable device is operating in a power-saving mode, controlling delivery of data of the wearable device which is transmitted based on coupling information between the user terminal and the wearable device in a network.

Also, in accordance with yet another aspect of the present disclosure, a user terminal of a communication system is provided. The user terminal includes: a transceiver that performs data communication; and a controller that controls interworking with a wearable device in order to communicate with the wearable device located within a short range which allows communication, and controlling delivery of data of the wearable device which is transmitted based on coupling information between the user terminal and the wearable device in a network, when the wearable device is operating in a power-saving mode.

Also, in accordance with still yet another aspect of the present disclosure, an application server of a communication system is provided. The application server includes: a communication interface for data communication; and a controller that controls registering coupling information between a user terminal and a wearable device, and transmitting data to be transmitted to the wearable device to the user terminal on the basis of the registered coupling information, when the wearable device is operating in a power-saving mode.

Further, in accordance with yet a further aspect of the present disclosure, a method for performing communication by a user terminal in a communication system is provided. The method includes: interworking with a wearable device in order to communicate with the wearable device located within a short range which allows communication; receiving data of the wearable device through a network; and transmitting the received data to the wearable device on the basis of at least one of a type of the data, a type of short-range communication for the interworking, and a state of the wearable device.

In the above-described configurations, a start or cancellation of the power-saving mode is configured using a timer.

In the above-described configurations, the wearable device sends, to a Mobility Management Entity (MME), a request for approval of the power-saving mode, and upon receiving the approval of the power-saving mode from the MME, starts the power-saving mode.

In the above-described configurations, when the interworking with the user terminal is cancelled, the wearable device transmits, to the MME, a trigger for a Mobile Originating (MO) call for cancelling the power-saving mode, and when the power-saving mode is cancelled, directly receives data transmitted from the application server.

BRIEF DESCRIPTION OF THE DRAWINGS

The above and other aspects, features and advantages of the present disclosure will be more apparent from the following detailed description taken in conjunction with the accompanying drawings, in which:

FIGS. 5A and 5B are a flow diagram illustrating a communication method for a wearable device operating in a PSM in a wireless communication system according to an embodiment of the present disclosure, FIGS. 7A and 7B are a flow diagram illustrating a data routing/forwarding procedure for a wearable device in a wireless communication system according to an embodiment of the present disclosure.

DETAILED DESCRIPTION

Figure 1:
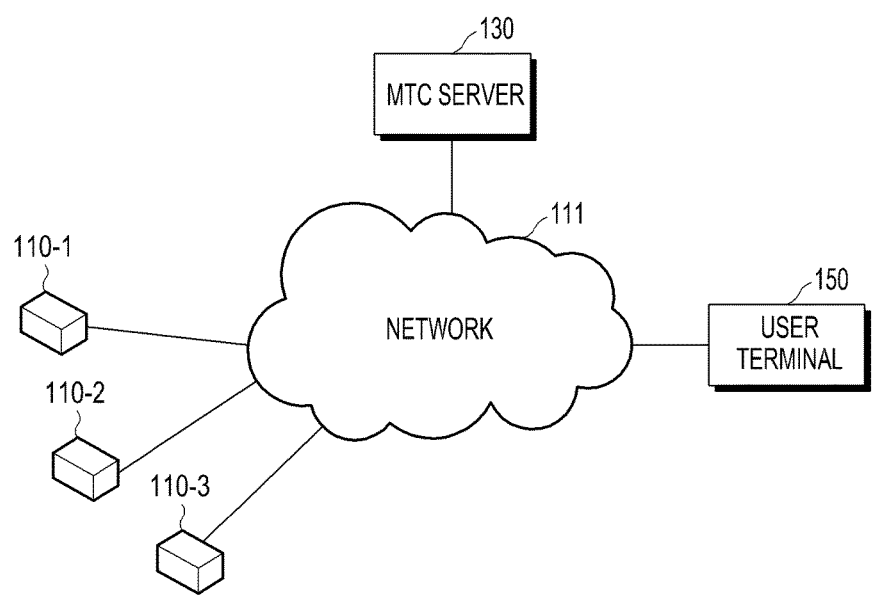
FIG. 1 is a view for explaining a communication scenario of typical MTC.

In the following description of embodiments of the present disclosure, when a detailed description of known functions and configurations incorporated herein is determined to unnecessarily obscure the subject matter of the present disclosure, the detailed description thereof will be omitted. Hereinafter, embodiments of the present disclosure will be described in detail with reference to the accompanying drawings.

Embodiments of the present disclosure propose a communication method and apparatus capable of effectively reducing power consumption of a wearable device in a wireless communication system. Embodiments of the present disclosure propose a method including: pre-registering, in an application server, coupling information between a wearable device and a user terminal, such as a smart phone that serves as a main/master/primary control device controlling communication of the wearable device; and according to an operating mode of the wearable device, transmitting data of the wearable device to a user terminal rather than to the wearable device.

Also, in embodiments of the present disclosure, in view of the type of the wearable data, a state of the wearable device, the type of wireless communication used to connect the user terminal to the wearable device, and the like (hereinafter "wearable data", etc.), the user terminal may determine whether data of the wearable device is to be forwarded/routed to the wearable device. The coupling information is mapping information between the wearable device and the user terminal. When the application server transmits data of the wearable device to a different device (e.g., a user terminal) other than the wearable device, the coupling information includes information on the different device to which the application server refers.

In embodiments of the present disclosure, a user terminal is described as an example of the main control device, but the main control device may be any of various types of wireless devices capable of directly accessing a wireless communication system and interworking with a different wireless device in a wireless/wired manner. Hereinafter, in embodiments of the present disclosure, for convenience of description, a Long-Term Evolution (LTE) system will be described as an example of a wireless communication system. However, wireless communication systems to which the present disclosure can be applied may be various types of wireless communication systems which support communication of wearable devices.

In embodiments of the present disclosure, a wearable device can directly access a wireless communication system, such as an LTE system, and supports operating modes including a PSM. Three modes, that is, a PSM, an idle mode, and a connected mode, will be described as examples of the operating modes. In the LTE system, the idle mode signifies a state in which a user terminal is powered on but does not communicate with a base station while being connected to the base station. In the idle mode, the user terminal is not communicating with the base station, but may perform the following operations.

Public Land Mobile Network (PLMN) selection
Cell selection and reselection
Location registration
Support for manual Closed Subscriber Group (CSG) selection In order to perform an operation in the idle mode, the user terminal periodically measures signals of a serving cell and neighboring cells. Also, as the need arises, the user terminal collects base station information by receiving and decoding system information of cells. For such an idle-mode operation, the user terminal consumes power thereof. However, a user terminal having a special purpose absolutely needs to reduce power consumption. For example, each of MTC devices, including meters, vending machines, and the like, communicates with a base station every few weeks or monthly, and thus does not need to continuously perform the idle-mode operation. Accordingly, in order to minimize power consumption, an unnecessary idle-mode operation may be suppressed. To this end, a PSM is discussed in an LTE system. The PSM is an operating mode in which a user terminal never perform a typical idle-mode operation for a determined time interval.

Figure 2:
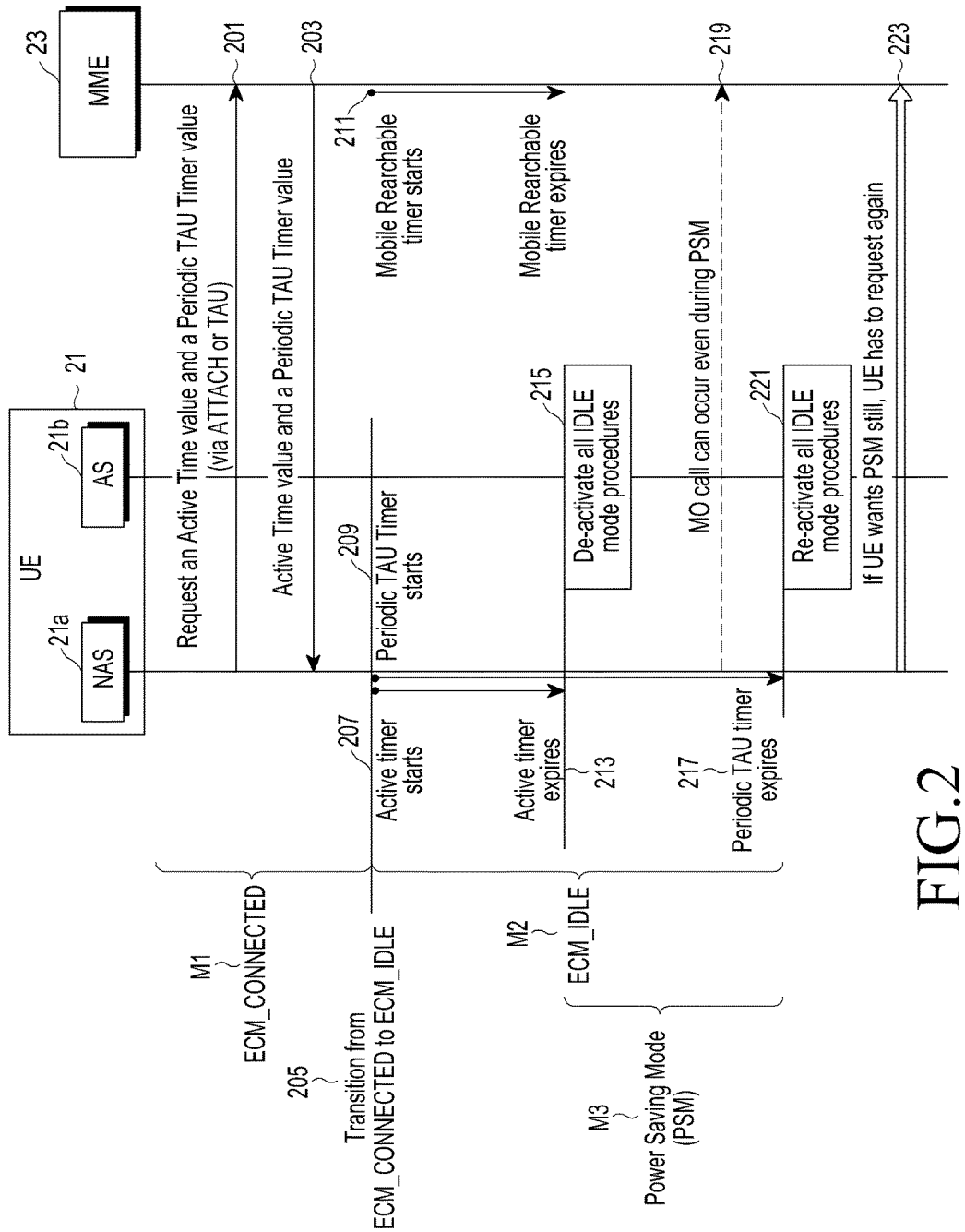
FIG. 2 is a diagram for explaining a Power-Saving Mode (PSM) in an LTE system.

FIG. 2 is a diagram for explaining a PSM in an LTE system.

Referring to FIG. 2, in operation 201, a Non Access Stratum (NAS) processor 21a of a user terminal 21 supporting the PSM sends, to an MME 23 of a network, a request for configuration of a PSM. The request is made when the user terminal 21 performs an ATTACH or Tracking Area Update (TAU) in relation to the MME 23. The ATTACH signifies a procedure in which the user terminal 21 is authenticated by the MME 23 and is registered in the MME 23. Through an ATTACH process, the MME 23 provides the user terminal 21 with registered PLMN information and equivalent PLMN information. A TAU process is performed by the user terminal 21 in order to provide the network with notification of the location of the user terminal 21. In the LTE system, for the purpose of paging and the like, the network detects the location of the user terminal 21 in units of TAs. TA is a set of a single cell or multiple cells. When the user terminal 21 that is moving enters a different TA, the user terminal 21 notifies the network that the user terminal 21 has entered the new TA. In order to perform the ATTACH and TAU processes, the user terminal 21 needs to communicate with the MME 23, and thus, when the user terminal 21 is in an idle mode M2, naturally needs to switch to a connected mode M1. In operation 203, the MME 23 approves the request for the PSM M3 which has been made by the user terminal 21, and provides the user terminal 21 with values of two types of timers. One of the two types of timers is an active timer, and the other is a periodic TAU timer. When the user terminal 21 switches (as indicated by reference numeral 205) from the connected mode M1 to the idle mode M2, in operations 207 and 209, the two types of timers start. Together with the starts of the two types of timers, in operation 211, the MME 23 also simultaneously starts one timer. Until the active timer expires, the user terminal 21 performs the above-described idle-mode operation. When the active timer expires in operation 213, in operation 215, the user terminal 21 switches to the PSM M3 in which all of the idle-mode operations and idle-mode-related timers are stopped. When the periodic TAU timer expires in operation 217 or when a MO call is triggered in operation 219, in operation 221, the user terminal 21 switches back to the idle mode M2 from the PSM M3, and performs an idle-mode operation. In operation 223, when the user terminal 21 desires to re-trigger the PSM M3, the user terminal 21 needs to send a request for a PSM to the MME 23.

Figure 3:
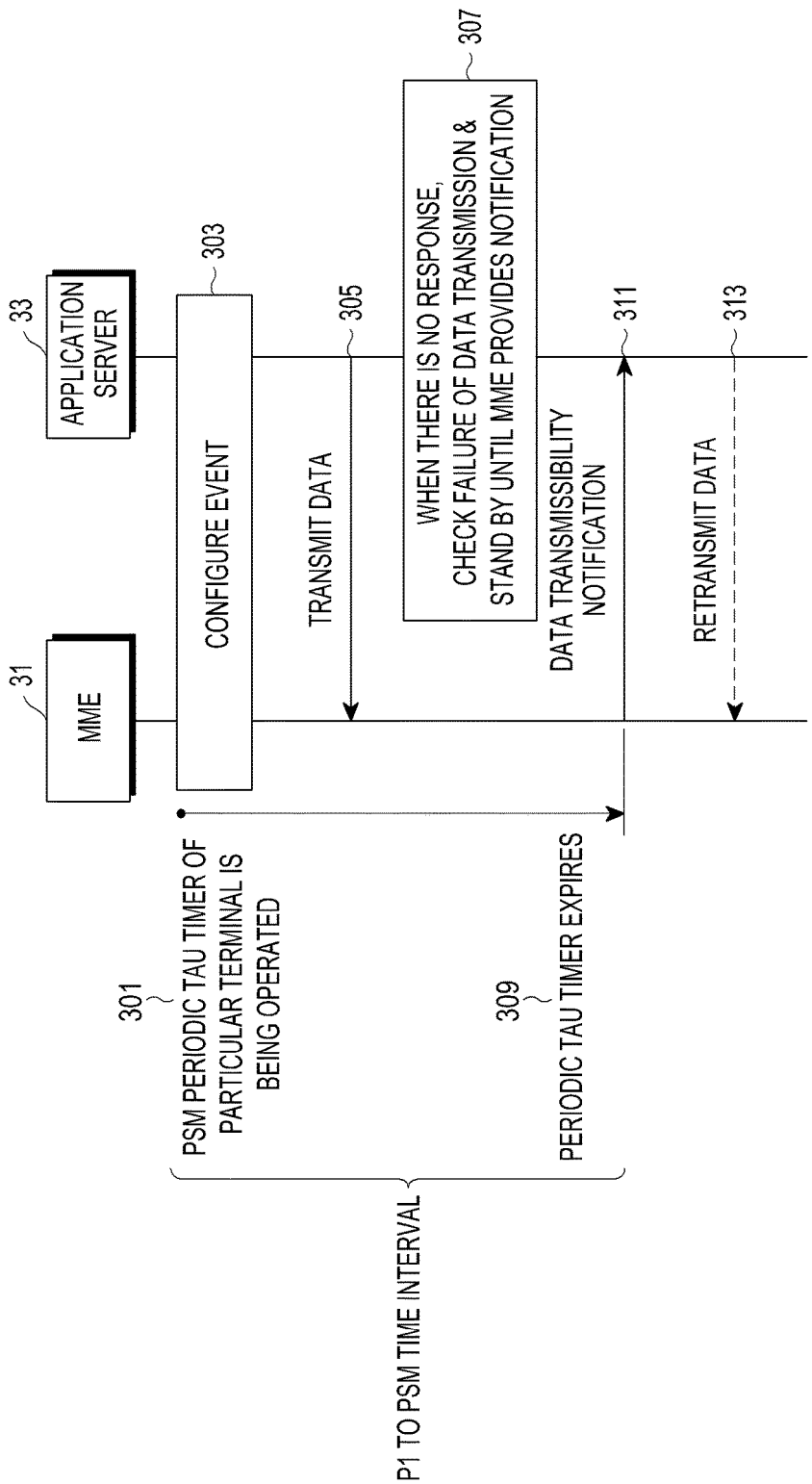
FIG. 3 is a diagram illustrating a procedure for notifying, by an MME, an application server of whether a terminal can receive data in a wireless communication system according to an embodiment of the present disclosure.

FIG. 3 is a diagram illustrating a procedure for notifying, by an MME, an application server of whether a terminal can receive data in a wireless communication system according to an embodiment of the present disclosure. When a wearable device is capable of directly accessing the LTE system, the terminal may be the wearable device.

Referring to FIG. 3, in operation 301, when the terminal switches to a PSM P1, although an application server 33 transmits data to the terminal, the terminal may not receive the data. The application server 33 is a server that transmits user data to the terminal. When the PSM of the terminal is completed (cancelled), the application server 33 may request an MME 31 to provide the application server 33 with notification of the cancellation of the PSM P1 of the terminal. This configuration prevents the application server 33 from unnecessarily transmitting data to the terminal in the PSM P1. To this end, in operation 303, the application server 33 transmits, to the MME 31, configuration information for requesting the notification. When the application server 33 transmits data to the terminal in operation 305 but the terminal does not respond to the data transmission in operation 307, in operation 307, the application server 33 regards the data transmission as failure, and may stand by until the MME 31 provides the application server 33 with notification of the cancellation of the PSM P1 of the terminal. In operation 309, the PSM P1 of the terminal is cancelled due to the expiration of a periodic TAU timer. The MME 31 may also independently operate a timer having the same time value, and thus may be made aware of whether the PSM P1 has been cancelled. Since the MME 31 has previously received the PSM cancellation notification request from the application server 33, in operation 311, the MME 31 provides the application server 33 with notification of the cancellation of the PSM P1 (i.e., data transmissibility notification). Then, in operation 313, the application server 33 may now transmit (retransmit) data to the terminal. Although, in operations 305 and 313 of FIG. 3, the indication line representing data transmission (retransmission) is illustrated as pointing towards the MME 31 for the purpose of simplified illustration of FIG. 3, the indication line signifies the transmission (retransmission) of data to the terminal, and actually, the data is not delivered to the MME 31 but is transmitted (retransmitted) to the terminal through a network.

The embodiment of the present disclosure, which will be described below, proposes a method including: pre-registering, in an application server, coupling information between a wearable device and a user terminal serving as a main control device; and when the wearable device switches to a PSM, transmitting, by the application server, data of the wearable device to the user terminal rather than to the wearable device.

In the LTE system, the wearable device may perform direct communication, but when the wearable device interworks with the user terminal, the wearable device may use the above-described PSM in order to reduce power consumption thereof. When the wearable device operates in the PSM and thus the transmission of data to the wearable device fails, the application server may retransmit data of the wearable device to the user terminal pre-registered using coupling information with the wearable device. Alternatively, when the MME provides the application server with notification of the cancellation of the PSM of the wearable device, the application server may retransmit the data to the user terminal. Also, according to the characteristics of the data to be transmitted, the application server may determine whether to retransmit the data to the user terminal or to stand by. For example, data having characteristics, including emergency information such as a disaster warning, a delay-sensitive service, and the like may be retransmitted to the user terminal. However, security-sensitive information needs to be directly transmitted to the wearable device. In this case, the application server stands by until the MME provides the application server with PSM cancellation notification, and directly transmits the data to the wearable device without passing through the user terminal.

Figure 4A:
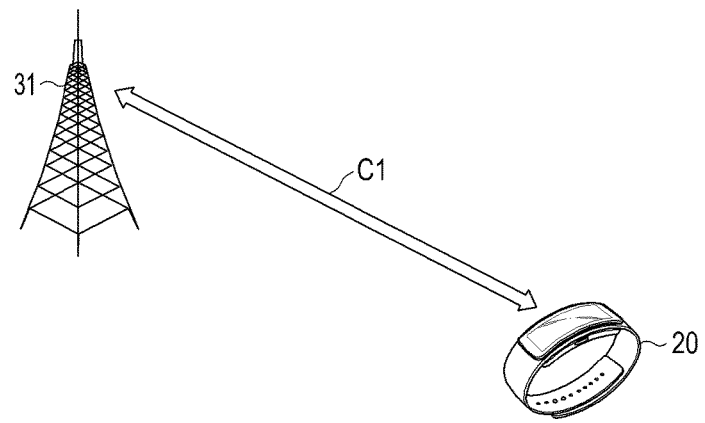
FIGS. 4A and 4B are views for explaining an operation of a wearable device in a PSM in a wireless communication system according to an embodiment of the present disclosure.
Figure 4B:
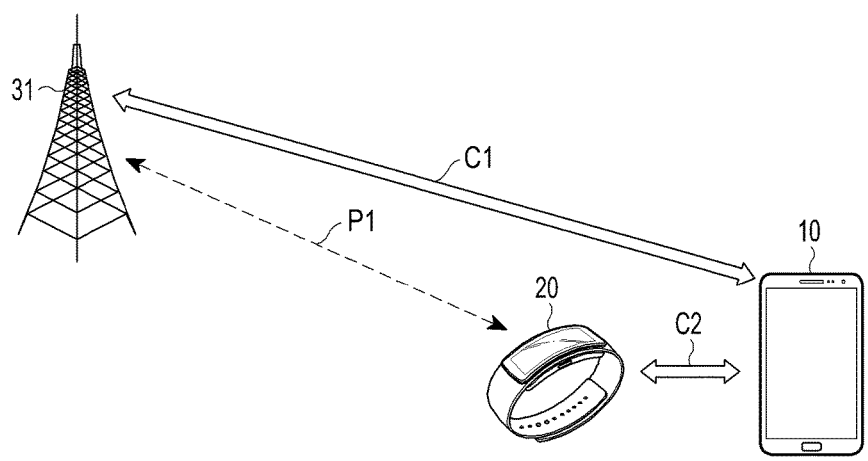

FIGS. 4A and 4B are views for explaining an operation of a wearable device in a PSM in a wireless communication system according to an embodiment of the present disclosure.

Referring to FIG. 4A, the wearable device 20 includes a modem for execution of direct communication C1 with a wireless communication system of an operator network. In this case, without the assistance of a different wireless device such as a user terminal, the wearable device 20 may directly communicate with a base station 31 of the wireless communication system. The wearable device 20 that is capable of performing direct communication can provide various user experiences as compared with a wearable device that is not capable of performing direct communication (i.e., that does not include a modem). Although the wearable device 20 is capable of performing the direct communication, as the example illustrated in FIG. 4B, the wearable device 20 may be used as ever together with a user terminal 10 such as a smart phone. Also, through interworking with the user terminal 10, a greater variety of services may be provided to the wearable device 20. The interworking of the wearable device 20 with the user terminal 10 may use various types of short-range communication C2, including Wi-Fi, Bluetooth, infrared communication, and the like.

In FIG. 4B, the wearable device 20 that is interworking with the user terminal 10 may be provided with application-based data through the user terminal 10. Typically, the amount of power consumed in short-range communication is known to be lower than that consumed in communication performed through an operator network. Accordingly, although the wearable device 20 is capable of directly communicating with an operator network, when the wearable device 20 is interworking with the user terminal 10, if the wearable device 20 is provided with data through the user terminal 10 rather than to the direct communication, power consumption of the wearable device 20 can be reduced. It goes without saying that the user terminal 10 needs to additionally receive data of the wearable device 20 from the base station 31 and needs to forward the received data to the wearable device 20, and thus needs to consume additional power. However, due to the trend toward miniaturization of the wearable device 20, it is more important to save power of the wearable device 20. Therefore, according to the circumstances, such a data providing method can be regarded as being efficient.

In FIG. 4B, when the wearable device 20 interworking with the user terminal 10 does not perform direct communication, the wearable device 20 no longer needs to exchange data with the base station 31, and thus switches to a PSM P1 in order to minimize power consumption. An application server may not transmit data to the wearable device 20 operating in the PSM P1, and thus may retransmit data to the user terminal 10 interworking with the wearable device 20. To this end, in an embodiment of the present disclosure, the interworking relationship between the wearable device 20 and the user terminal 10 is pre-registered in the application server as coupling information.

Also, in an embodiment of the present disclosure, when the application server fails to transmit data to the wearable device 20 or recognizes that the wearable device 20 is in a PSM, the application server transmits data of the wearable device to the user terminal pre-registered using the coupling information. In an embodiment of the present disclosure, a user terminal is described as an example of a main control device interworking with a wearable device, but the main control device may be replaced by a different device, which is capable of interworking with the wearable device, as well as the user terminal.

Also, one wearable device may be pre-registered together with multiple main control devices. For example, a first main control device may be a user terminal, and a second main control device may be an automobile capable of performing wireless communication. When the application server is not capable of transmitting data to the wearable device, the application server selects one main control device from among the multiple main control devices, and transmits data of the wearable device to the selected main control device. At this time, a user pre-configures priorities of main control devices that are to receive the data, and may register (configure) the pre-configured priorities thereof in the application server. Accordingly, when the application server transmits the data according to the priorities thereof and then the data transmission fails, the application server may retransmit the data to a main control device having a lower priority. Even when the application server is not capable of transmitting data to the wearable device, according to the type of data, the application server determines whether the data is to be transmitted to a main control device. The types of data may be classified according to whether the data requires security, whether the data is capable of being received/forwarded by a user terminal, and the like. For example, when transmission of data requires a high level of security or when a related application and the like, which allow forwarding of data to a wearable device, are not installed in a user terminal, the application server may not transmit the data to the user terminal, but may stand by until the application server is capable of directly transmitting the data to the wearable device. Also, in order to effectively transmit the data, when data is capable of being transmitted to the wearable device, the application server may pre-configure an MME so as to provide the application server with data transmissibility notification.

In another embodiment of the present disclosure, multiple wearable devices may interwork therebetween. As an example, when a first wearable device is operating in a PSM or is not capable of receiving data, an application server may transmit data of the first wearable device to a second wearable device registered using coupling information.

Figure 5A:
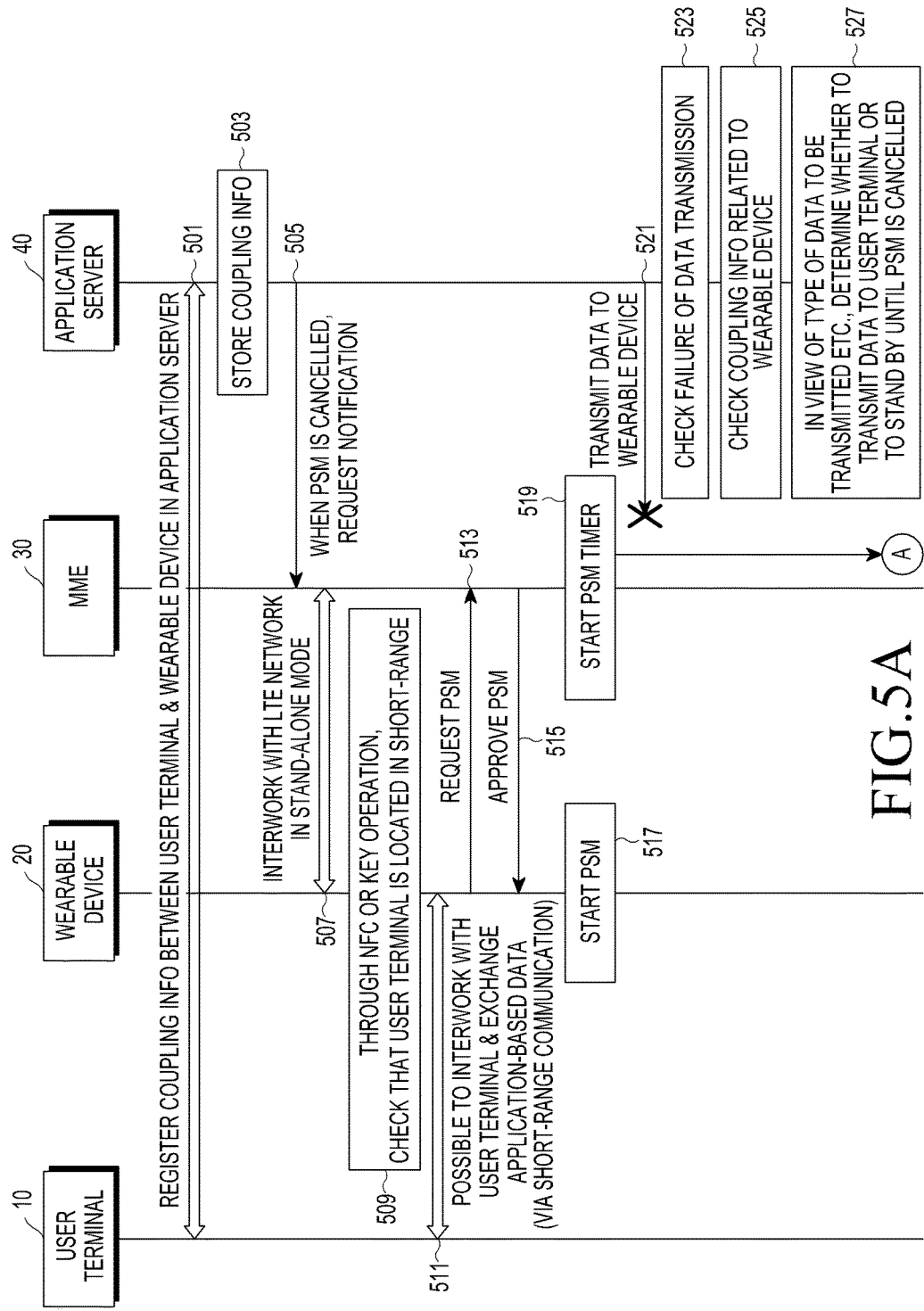

FIGS. 5A and 5B are a flow diagram illustrating a communication method for a wearable device operating in a PSM in a wireless communication system according to an embodiment of the present disclosure.

Referring to FIG. 5A, in operation 501, an application server 40 registers coupling information between a user terminal 10 and a wearable device 20, and in operation 503, stores the coupling information. The coupling information may be registered using various methods in which: the coupling information is registered in the application server 40 by using information which is input through the user terminal 10 or the wearable device 20; a user accesses a website, which is provided by the application server 40, and registers the coupling information on the website; and a user registers the coupling information in a server. The application server 40 may use at least one server among servers that provide a messenger service, a Social Network Service (SNS), a health care service, a content-based service, and various services provided by a manufacturer of the wearable device 20. Also, multiple application servers 40 may exist, and coupling information of one or more wearable devices may be registered in one or more application servers.

In operation 505, the application server 40 may send, to an MME 30, a request for notification of the case in which a PSM of the wearable device 20 is cancelled. The wearable device 20 may include a modem for direct communication with an operator network (e.g., an LTE network), and as in operation 507, may perform direct communication (a stand-alone mode) with the LTE network. In operation 509, through short-range wireless communication (e.g., Near-Field Communication (NFC)), the wearable device 20 may recognize that the user terminal 10, which is a main control device, is located within a short range. Alternatively, in a manual manner (e.g., through a user's key operation, etc.), the wearable device 20 may recognize that the user terminal 10 is located within a short range. When the wearable device 20 recognizes that the user terminal 10 is located within a short range, the wearable device 20 may request interworking with the user terminal 10. In operation 511, when an interworking process between the user terminal 10 and the wearable device 20 is completed, by using at least one short-range communication technology, the user terminal 10 and the wearable device 20 may exchange application-based data with each other. In an embodiment of the present disclosure, an example is described in which short-range communication technology is used during the interworking, but wired interworking using a cable may also be implemented. The wearable device 20 may interwork with the user terminal 10 and may exchange required application-based data over the network through the user terminal 10. The wearable device 20 conventionally has a small size, and thus includes a battery having a limited size. Accordingly, when the wearable device 20 is used for a long time, the wearable device 20 may be more vulnerable to a power shortage problem. Therefore, when the wearable device 20 interworks with the user terminal 10, the wearable device 20 has a function of independently communicating with the network, but needs to restrain direct exchange of data over the network which is expected to consume a lot of power. Since the wearable device 20 is interworking with the user terminal 10, in operation 513, the wearable device 20 sends a PSM request to the MME 30, and in operation 515, the MME 30 approves the PSM request. In operation 517, the wearable device 20 switches to a PSM in response to the approval. At this time, at least one of the user terminal 10 and the wearable device 20 may operate a PSM timer identically to the operation of a PSM timer by in the MME 30. Then, in operation 519, the MME 30 operates the PSM timer in order to determine when the PSM of the wearable device 20 is cancelled. At this time, in operation 521, the application server 40 does not recognize that the wearable device 20 is in the PSM, and may transmit data to the wearable device 20. However, in this case, since the wearable device 20 is in the PSM, in operation 523, the application server 40 does not receive a response to the data transmission from the wearable device 20, and checks the failure of the data transmission. Then, in operation 525, the application server 40 checks whether there exists coupling information pre-registered in relation to the wearable device 20. At this time, in operation 527, although the related coupling information exists, in view of the type of data of the wearable device 20 to be transmitted, and the like, the application server 40 determines whether data is to be transmitted to a coupled different device, that is, the user terminal 10 interworking with the wearable device 20, or whether the application server 40 is to stand by until the PSM of the wearable device 20 is cancelled.

In another embodiment of the present disclosure, in a particular situation, for example, periodically or when the user terminal 10 or the wearable device 20 is powered on, the user terminal 10 or the wearable device 20 reports the coupling information to the MME 30. When the wearable device 20 interworks with the user terminal 10, the wearable device 20 sends a request for a PSM to the MME 30. At this time, when the wearable device 20 coinciding with the coupling information sends a request for a PSM to the MME 30, the MME 30 transmits data, which needs to be transmitted to the wearable device 20, to the user terminal 10 registered using the coupling information rather than to the wearable device 20. Then, the user terminal 10 retransmits the received data to the wearable device 20. When the PSM is cancelled, the MME 30 provides the application server 40 with notification of the cancellation of the PSM, so as to allow the application server 40 to transmit the data, which needs to be transmitted to the wearable device 20, to the wearable device 20.

Examples of the PSM may include extended Discontinuous Reception (DRX) as well as the power-saving mode described in the example of FIG. 2. The extended DRX signifies DRX having a period longer than that of the existing DRX. The maximum period of the existing DRX is, for example, 2.56 seconds, but the period of the extended DRX may be extended to tens of minutes or several hours.

Referring to FIG. 5B, when the application server 40 determines, in operation 527, that the data of the wearable device 20 is transmitted to the user terminal 10, in operation 529, the application server 40 transmits the data to the user terminal 10. In operation 531, the user terminal 10 forwards the data, which has been received from the application server 40, to the wearable device 20 via short-range communication.

Meanwhile, in FIG. 5B, a procedure indicated by reference numeral 51 represents operations in a case where the interworking between the wearable device 20 and the user terminal 10 is cancelled, and a procedure indicated by reference numeral 53 represents operations in a case where the PSM timer expires.

First, the procedure indicated by reference numeral 51 is described. When the wearable device 20 recognizes, in operation 533, that the wearable device 20 is located far from the user terminal 10 through short-range communication or through a user's key operation and the like in operation 533, in operation 535, the interworking between the wearable device 20 and the user terminal 10 may be cancelled. At this time, the wearable device 20 switches from the PSM to a state in which the wearable device 20 is capable of directly communicating over the network. To this end, in operation 537, the wearable device 20 may trigger, for example, a MO call for cancelling a PSM. At this time, the wearable device 20 does not contain data which actually needs to be transmitted, and thus may trigger a TAU. In operation 539, due to the MO call, the MME 30 checks the cancellation of the PSM of the wearable device 20, and provides the application server 40 with notification of the cancellation of the PSM.

Also, the procedure indicated by reference numeral 53 is described. When the PSM timer expires in operation 541, in operation 543, the interworking for a PSM between the wearable device 20 and the user terminal 10 is cancelled. In the LTE system, a periodic TAU timer may be used as the PSM timer. The PSM timer is operated in each of the user terminal 10 and the MME 30, and thus, the user terminal 10 and the MME 30 may simultaneously be made aware of the cancellation of the PSM. In this case, similarly, in operation 545, the MME 30 provides the application server 40 with notification of the cancellation of the PSM of the wearable device 20. Also, when the wearable device 20 desires the PSM to further continue, in operation 547, the wearable device 20 may send (re-send) a request for a PSM to the MME 30.

In the above-described embodiment of the present disclosure, the role of the main control device (i.e., the user terminal) is to forward data to the wearable device with which the main control device is interworking. In this case, the application server is given more roles. For example, the application server determines whether data of the wearable device, which cannot receive data, is to be transmitted to the user terminal. Also, the application server or the main control device (the user terminal) does not direct the wearable device to change to a certain operation.

In the embodiment of the present disclosure, which will be described below, more roles related to routing and forwarding of data are given to a user terminal which is a main control device. In the present embodiment, by a user (e.g., during installation of an application) or by using the various methods described by way of example above, coupling information between a user terminal and a wearable device may be pre-registered in an application server. When the wearable device interworks with the user terminal, the wearable device provides the application server with notification of the interworking thereof with the user terminal. The application server transmits data of the wearable device to the user terminal that serves as a main control device. In view of the type/characteristics of the received data, a communication type used when the user terminal interworks with the wearable device, a state of the wearable device with which the user terminal is interworking, and the like, the user terminal determines whether the data is to be routed to the wearable device. The user terminal, which is a main control device, may interwork with multiple wearable devices, and in view of traffic QoS, an interworking communication type, states of the wearable devices, and the like, may determine a priority of data to be routed.

Figure 6:
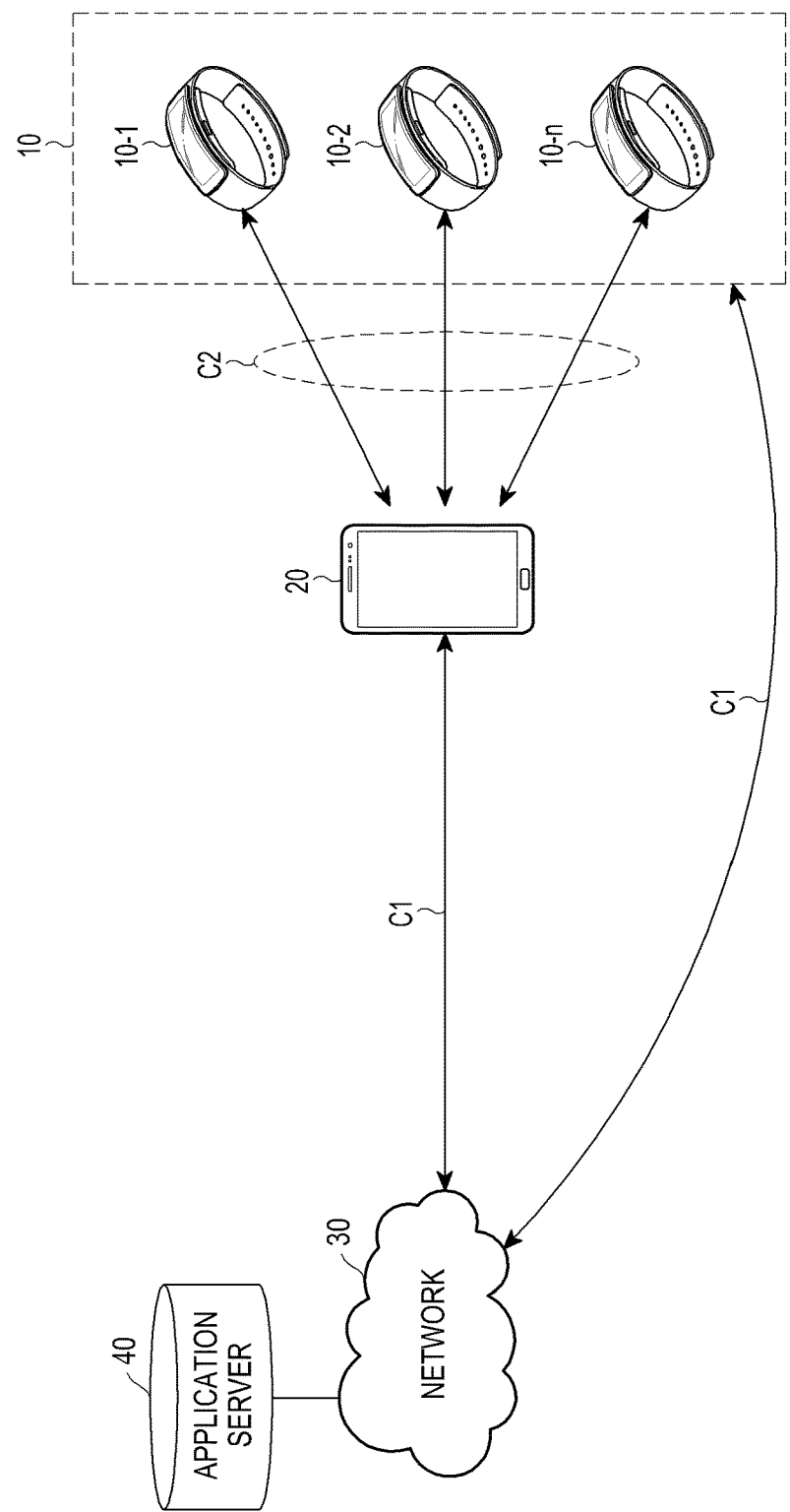
FIG. 6 is a view for explaining a data routing/forwarding scheme for a wearable device in a wireless communication system according to an embodiment of the present disclosure.

FIG. 6 is a view for explaining a data routing/forwarding scheme for a wearable device in a wireless communication system according to an embodiment of the present disclosure.

FIG. 6 is a view for explaining an operation of the user terminal 20 that, when multiple wearable devices 10-1, 10-2, . . . , and 10-n (as indicated reference numeral 10) interwork with a user terminal 20, serves as a traffic router for the wearable devices 10.

Referring to FIG. 6, a user terminal 20, which is a main control device, may be connected for communication to a base station of an operator network 30 (as indicated by reference numeral C1), and may interwork with one or more wearable devices 10 via short-range communication C2. The wearable devices 10 may interwork with the user terminal 20, and may be directly connected for communication to the network 30 (as indicated by reference numeral C1). Through the above-described pre-registration of coupling information, an application server 40 is made aware of a mapping relationship between the wearable devices 10 and the user terminal 20. The wearable devices 10 may request the application server 40 to transmit data of the wearable devices through the user terminal 20, which is a main control device, to the wearable devices. Alternatively, when a particular condition is satisfied, without a request from the wearable devices 10, the application server 40 may transmit data of the wearable devices 10 to the user terminal 20. For example, as in the example illustrated in FIG. 5, when the wearable devices 10 operate in a PSM, without a request from the wearable devices 10, the application server 40 may transmit data of the wearable devices 10 to the user terminal 20. In the present embodiment, the user terminal 20, having received the data of the wearable devices 10, performs a kind of router function. In view of the type/characteristics of data, a communication type used when the user terminal 20 interworks with the wearable devices 10, states of the wearable devices 10 with which the user terminal 20 is interworking, and the like, the user terminal 20 determines whether the data is to be routed to the wearable devices 10. Also, as the need arises, the user terminal 20 may direct the wearable devices 10 to directly access the network 30 and receive data. The user terminal 20 may interwork with the multiple wearable devices 10, and thus, data which need to be simultaneously routed may exist. In this case, a priority may be assigned to each of the pieces of data, and data may be transmitted to each of the wearable devices 10 according to the priority thereof. In another embodiment of the present disclosure, according to the type of data to be transmitted to the wearable devices 10, the type of short-range communication used by the wearable devices 10, and the like, the application server 40 does not transmit data of the wearable devices 10 to the wearable devices 10 or the user terminal 20, but may transmit the same to a separate cloud server (not illustrated). In this case, the application server 40 may provide the wearable devices 10 or the user terminal 20 registered using the coupling information with notification of the storage of data to be transmitted to the wearable devices 10 in the cloud server. Then, the wearable devices 10 or the user terminal 20 may access the cloud server and may download the stored data from the cloud server.

In the embodiment illustrated in FIG. 6, a description will be made of various schemes (the following examples 1 to 5) in which, according to the type/characteristics of data, a communication type used when the wearable devices 10 interwork with the user terminal 20, states of the wearable devices 10 with which the user terminal 20 is interworking, and the like, the user terminal 20 determines whether the data is to be routed to the wearable devices 10, or assigns a priority to routing.

1) According to the characteristics of data, the user terminal that is a main control device may forward/route data.

Specifically, if the security of short-range communication, which is used when the wearable device interworks with the main control device, does not satisfy a predetermined level or higher, data which requires security is not forwarded. At this time, the main control device may take an additional step for the relevant wearable device. For example, the main control device may direct the wearable device, which is in a PSM or an idle mode, to directly connect to a network. The wearable device, which switches to a connected mode with the network, may directly receive the data which requires high security. In the case of emergency information, including a disaster warning and the like, data may be routed to the wearable device with the highest priority. Delay-sensitive data, including a voice service and the like, may be routed with a high priority.

2) According to the type of short-range communication used when a main control device interworks with the wearable device, the main control device may forward/route data.

Specifically, when the main control device interworks with the wearable device via Wi-Fi, the main control device may forward a large amount of data. However, in this case, the main control device may not forward data which requires high security. When the main control device interworks with the wearable device by using Bluetooth, the main control device may not forward a large amount of data. This is because Bluetooth communication technology itself is inappropriate for transmitting a large amount of data. Also, in this case, the main control device may not forward data which requires high security. Accordingly, the main control device may reconfigure short-range communication technology, which is used to interwork with the wearable device, according to the type and characteristics of data. For example, when the main control device needs to forward a large amount of data while the main control device interworks with the wearable device via Bluetooth, the main control device may re-interwork with the wearable device via Wi-Fi. Also, interworking using wired communication is advantageous in that a large amount of data can be transmitted and high security can be maintained.

3) A main control device and an application server may perform forwarding/routing according to a state (a PSM, an idle mode, a connected mode, etc.) of the wearable device.

Specifically, when the wearable device is in a PSM, the main control device may forward data of the wearable device. When a battery of the wearable device has a value smaller than or equal to a predetermined threshold, the main control device may temporarily store a large amount of data without forwarding the large amount of data. When the battery of the wearable device is charged and returns to a value larger than or equal to the predetermined threshold, the main control device may forward the stored data. When the wearable device is in an idle mode, in order to reduce signaling overhead generated when the wearable device is directly connected to a network, the wearable device may request the application server to transmit data having a small size to the main control device. When the wearable device is in a connected mode, although the wearable device is directly connected to the network, for the purpose of a reduction of power consumption of the wearable device, preferential reception of priority data, and a reduction in fees to be paid, the wearable device may also request the application server to transmit data of a particular wearable device to the main control device.

4) Application-based voice services may be provided in various forms. When a call is received by the wearable device that is interworking with a main control device, an application server, which provides a voice service, may direct the wearable device to connect to the main control device via short-range communication (e.g., Bluetooth, etc.) capable of supporting a voice service, and may provide voice data through the main control device, thereby reducing power consumption of the wearable device.

5) A main control device may interwork with multiple wearable devices, and there may exist data which need to be simultaneously forwarded to the multiple wearable devices. In this case, a priority may be assigned to each of the pieces of data in view of the type/characteristics of each of the pieces of data, the QoS thereof, and the like, and the data need to be sequentially forwarded according to the priorities thereof. For example, emergency information, including a disaster warning and the like, may be assigned the highest priority. A control message between the main control device and the wearable devices also has a high priority. Next, delay-sensitive services, such as a voice service, may be assigned a high priority. Services (e.g., a File Transfer Protocol (FTP) file) which do not encounter a problem even when data is received in the background may be allowed to be assigned a low priority.

In the above-described embodiment of the present disclosure, various examples have been described in which a main control device (e.g., a user terminal, etc.) determines whether data to be transmitted to a wearable device is to be forwarded/routed. In another embodiment of the present disclosure, an application server may determine whether data to be transmitted to a wearable device is to be forwarded/routed.

Figure 7B:
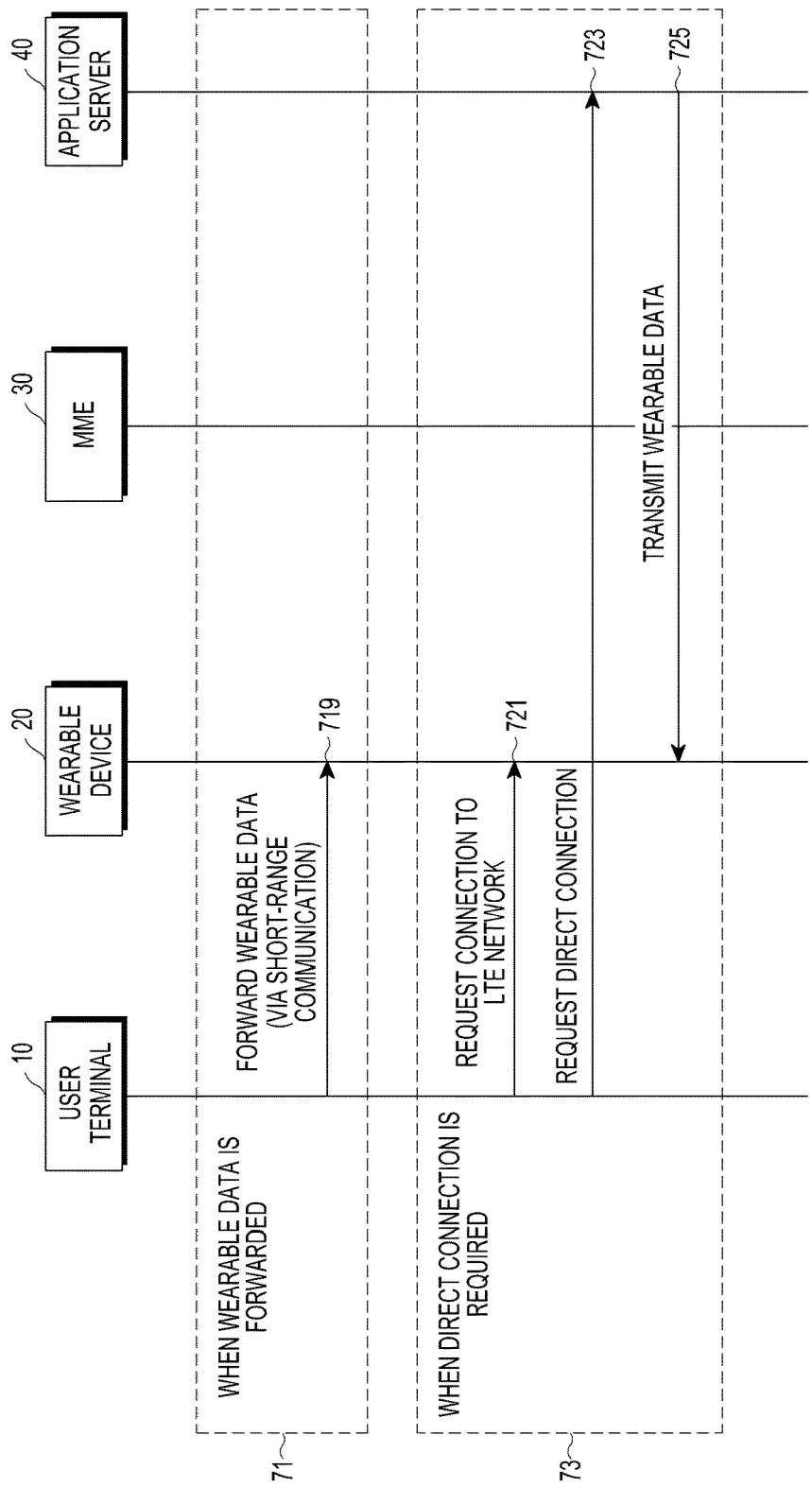

FIGS. 7A and 7B are a flow diagram illustrating a data routing/forwarding procedure for a wearable device in a wireless communication system according to an embodiment of the present disclosure.

Referring to FIG. 7A, in operation 701, coupling information between a user terminal 10 and a wearable device 20 is registered in an application server 40. In operation 703, the application server 40 stores the coupling information. As various schemes for registering the coupling information, the schemes described with reference to FIGS. 5A and 5B may be identically used. In another embodiment of the present disclosure, the above-described coupling information is registered in a communication operator server or the like, and one or more application servers may share the coupling information.

The wearable device 20 may include a modem capable of performing direct communication through an operator network 30, and as in operation 705, the wearable device 20 may directly communicate with the operator network 30. In operation 707, through short-range wireless communication, the wearable device 20 may recognize that the user terminal 10, which is a main control device, is located within a short range. Alternatively, a user may manually make a request for interworking. In operation 709, when an interworking process between the user terminal 10 and the wearable device 20 is completed, by using at least one of short-range communication technologies or wired communication technology such as connection via a cable, the user terminal 10 may exchange application-based data with the wearable device 20. In operation 711, the wearable device 20 is in a state of interworking with the user terminal 10, and thus provides the application server 40 with notification of interworking with the user terminal 10. At this time, the wearable device 20 may provide the application server 40 with notification of a state (i.e., a connected mode, an idle mode, a PSM, etc.) of the wearable device 20 together with the above notification. In another embodiment of operation 711, the user terminal 10 may provide the application server 40 with notification of interworking with the wearable device 20. Then, in operation 713, the application server 40 checks whether there exists coupling information pre-registered in relation to the wearable device 20. Then, in operation 715, the application server 40 transmits data of the wearable device 20 to the user terminal 10. In operation 717, in view of the type/characteristics of data, a communication type used to interwork with the wearable device 20, a state of the wearable device 20 with which the user terminal 10 is interworking, and the like, the user terminal 10 determines whether the data is to be routed/forwarded to the wearable device 20.

Meanwhile, in FIG. 7B, a procedure indicated by reference numeral 71 represents operations in a case where the user terminal 10 routes/forwards data, and a procedure indicated by reference numeral 73 represents operations in a case where the wearable device 20 directly connects to the network 30 and receives data.

First, the procedure indicated by reference numeral 71 is described. When the user terminal 10 determines that data is to be routed/forwarded, in operation 719, the user terminal 10 routes/forwards the data, which has been received from the application server 40, to the wearable device 20 via short-range communication. The procedure indicated by reference numeral 73 is described below. When the wearable device 20 directly connects to the network 30 and receives data, in operations 721 and 723, the user terminal 10 sends a request for (provides notification of) direct connection of the wearable device 20, to each of the wearable device 20 and the application server 40. Then, in operation 725, the application server 40 directly transmits (retransmits) data to the wearable device 20.

The above-described embodiments may be independently practiced or may be practiced such that multiple embodiments thereof are combined with each other.

Figure 8:
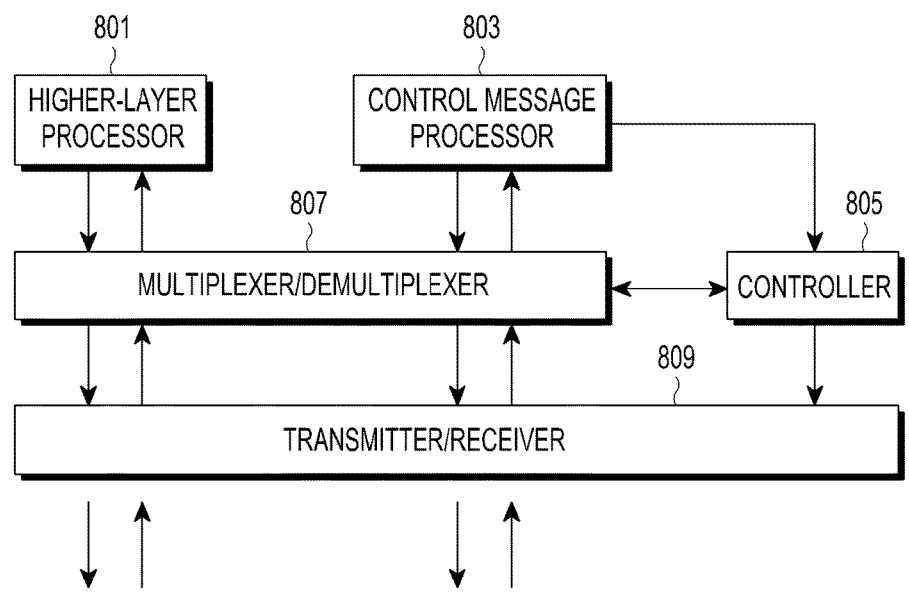
FIG. 8 is a block diagram illustrating a configuration of a user apparatus in a wireless communication system according to an embodiment of the present disclosure.

FIG. 8 is a block diagram illustrating a configuration of a user terminal or a wearable device (hereinafter, a "user apparatus") in a wireless communication system according to an embodiment of the present disclosure.

In FIG. 8, the user apparatus transmits/receives data or the like through a higher-layer processor 801, and transmits/receives control messages through a control message processor 803. Also, when the user apparatus transmits a control signal or data to a base station, according to the control of a controller 805, the user apparatus multiplexes the control signal or data through a multiplexer/demultiplexer 807, and then transmits, through a transceiver 809, data output from the multiplexer/demultiplexer 807. In contrast, when the user apparatus performs reception, according to the control of a controller 805, the user apparatus receives a physical signal through the transceiver 809, demultiplexes the received signal through the multiplexer/demultiplexer 807, and then delivers each of signals output from the multiplexer/demultiplexer 807, to the higher-layer processor 801 or the control message processor 803 according to message information.

Also, in FIG. 8, the controller 805 controls the entire apparatus so as to perform an operation in a PSM and a data routing/forwarding operation according to the communication methods described in the embodiments illustrated in FIGS. 3 to 7. The elements indicated by reference numeral 801, 803, 805, and 807 may be implemented by one or more controllers (or processors).

Figure 9:
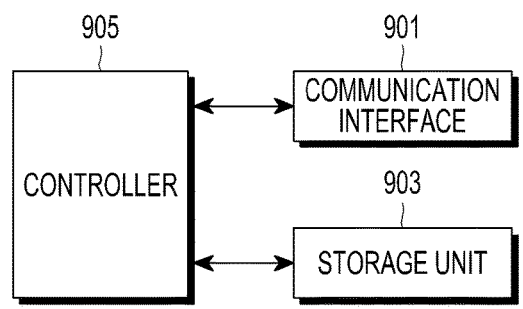
FIG. 9 is a block diagram illustrating a configuration of a server apparatus in a wireless communication system according to an embodiment of the present disclosure.

FIG. 9 is a block diagram illustrating a configuration of an MME or an application server (hereinafter, a "server apparatus") in a wireless communication system according to an embodiment of the present disclosure. The MME may be implemented in the form of a server in a network. In the above-described embodiments of the present disclosure, an operation of the MME may be performed by a different network entity in an operator network.

Referring to FIG. 9, the server apparatus may include: a communication interface 901 that performs communication with a different network entity in a network; a storage unit 903 that stores data; and a controller 905 that controls the entire apparatus so as to perform an operation in a PSM and a data routing/forwarding operation according to the communication methods described in the embodiments illustrated in FIGS. 3 to 7.

The invention claimed is:

1. A method for performing communication by a user terminal in a communication system, the method comprising:
   interworking with a wearable device to communicate with the wearable device located within a short range which allows communication;
   determining whether data of the wearable device is forwarded to the wearable device, on the basis of a type of the data of the wearable device, and
   delivering the data of the wearable device which is received based on coupling information between the user terminal and the wearable device in a network, when it is determined that the data of the wearable device is forwarded to the wearable device.

2. The method of claim 1, further comprising registering the coupling information between the wearable device and the user terminal,
   wherein the coupling information comprises mapping information between the wearable device and the user terminal.

3. The method of claim 1, wherein the determining of whether the data of the wearable device is forwarded to the wearable device, on the basis of a type of the data of the wearable device comprises, when the wearable device is operating in a power-saving mode (PSM), determining whether the data of the wearable device is forwarded to the wearable device, on the basis of the type of the data of the wearable device, a communication type used to interwork with the wearable device, and a state of the wearable device.

4. The method of claim 1, further comprising requesting for a direct connection of the wearable device to an application server, when it is determined that the data of the wearable device is not forwarded to the wearable device.

5. The method of claim 1, wherein the interworking with a wearable device is cancelled, when a PSM timer expires.

6. A user terminal of a communication system, the user terminal comprising:
   a transceiver configured to perform data communication; and
   a controller configured to:
   interwork with a wearable device to communicate with the wearable device located within a short range which allows communication,
   determine whether data of the wearable device is forwarded to the wearable device, on the basis of a type of the data of the wearable device, and deliver the data of the wearable device which is received based on coupling information between the user terminal and the wearable device in a network, when it is determined that the data of the wearable device is forwarded to the wearable device.

7. The user terminal of claim 6,
wherein the controller is further configured to register the coupling information between the wearable device and the user terminal, and
wherein the coupling information comprises mapping information between the wearable device and the user terminal.

8. The user terminal of claim 6, wherein the controller is further configured to determine whether the data of the wearable device is forwarded to the wearable device, on the basis of the type of the data of the wearable device, a communication type used to interwork with the wearable device, and a state of the wearable device, when the wearable device is operating in a power-saving mode (PSM).

9. The user terminal of claim 6, wherein the controller is further configured to request for a direct connection of the wearable device to an application server, when it is determined that the data of the wearable device is not forwarded to the wearable device.

10. The user terminal of claim 6, wherein the controller is further configured to cancel interworking with the wearable device, when a PSM timer expires.

11. A method for performing communication by an application server in a communication system, the method comprising:
registering coupling information between a user terminal and a wearable device;
determining whether data of the wearable device is forwarded to the wearable device, on the basis of a type of the data of the wearable device; and
transmitting data to be transmitted to the wearable device to the user terminal on the basis of the registered coupling information, when it is determined that the data of the wearable device is forwarded to the wearable device.

12. The method of claim 11, further comprising:
directly transmitting the data of the wearable device to the wearable device, when it is determined that the data of the wearable device is not forwarded to the wearable device.

13. The method of claim 11, further comprising:
waiting for transmission of the data to be transmitted to the wearable device until a PSM timer is cancelled.

* * * * *